US006588856B2

(12) United States Patent  
Herbst et al.

(10) Patent No.: US 6,588,856 B2
(45) Date of Patent: Jul. 8, 2003

(54) MODULATOR RELAY VALVE ASSEMBLY AND METHOD

(75) Inventors: Robert J. Herbst, Avon, OH (US); Gregory R. Ashley, Armherst, OH (US); George S. Wagner, Lorain, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 09/924,187

(22) Filed: Jul. 30, 2001

(65) Prior Publication Data

US 2003/0020329 A1 Jan. 30, 2003

(51) Int. Cl.[7] ................................................. B60T 8/34
(52) U.S. Cl. .................. 303/119.2; 303/118.1
(58) Field of Search ............. 303/115.1, 115.2, 303/118.1, 119.1, 119.2

(56) References Cited

U.S. PATENT DOCUMENTS 4,776,648 A * 10/1988 Newton et al. ............ 303/22.5
4,944,564 A * 7/1990 Balukin et al. ............... 303/33
5,234,265 A * 8/1993 Tyler ........................ 303/118.1
6,238,013 B1 * 5/2001 Koelzer ..................... 303/118.1
6,386,649 B1 * 5/2002 Ross ......................... 303/119.2

FOREIGN PATENT DOCUMENTS

WO    WO 01/25067 A1    4/2001

* cited by examiner

Primary Examiner—Christopher P. Schwartz
(74) Attorney, Agent, or Firm—Calfee, Halter & Griswold LLP

(57) ABSTRACT

A modulator relay valve assembly for selectively controlling brake application to an associated brake chamber is provided. The modulator relay valve assembly comprises a housing having a supply port, a delivery port, a control port, and an exhaust port. A piston is received in the housing defining a control volume in communication with the control port and is movable to control communication among the supply, delivery, and exhaust ports. A quick release valve with a direct passage to atmosphere communicates with the control volume, allowing contaminants to be expelled form the control volume during service and ABS braking. The quick release valve is biased toward an open position allowing communication from a control volume to atmosphere during service brake and ABS brake applications to decrease a pressure exerted by the control volume on the piston.

26 Claims, 3 Drawing Sheets

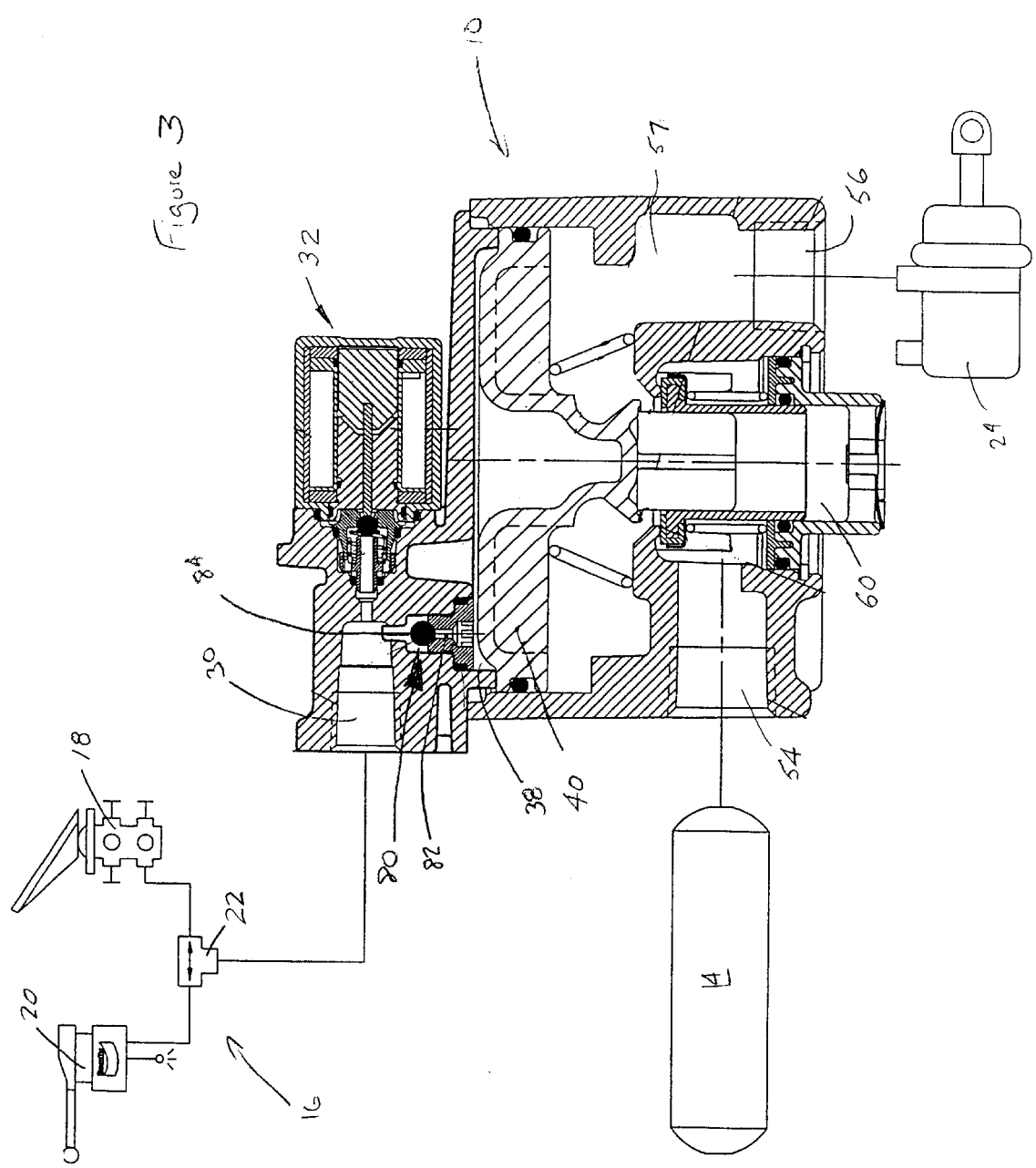

MODULATOR RELAY VALVE ASSEMBLY AND METHOD

BACKGROUND OF THE INVENTION

This application relates to the art of braking systems, and more particularly to an antilock brake system (ABS) modulator relay valve. The invention is particularly applicable to a tractor or tractor-trailer type vehicle equipped with an air braking system in which a vehicle operator generates a control signal to operate a brake control valve. The signal is transmitted to relay valves which communicate compressed air from storage reservoirs to vehicle brakes. It will be appreciated, however, that the invention may relate to similar environments and applications.

A modulator relay valve for ABS brake systems typically includes an impermeable or solid walled piston or flexible diaphragm that selectively moves during normal service braking to establish communication among supply, delivery, and exhaust ports. The piston is responsive to a control signal provided, for example, from a foot brake valve or trailer control valve through a double-check valve. The control signal communicates with a control volume cavity to create a pressure on the piston. Thus, by increasing or decreasing the control signal, or pressure on the piston, the piston is selectively movable. The piston actuates an inlet/exhaust valve to selectively connect the supply, delivery, and exhaust ports. In general, connecting the supply port to the delivery port causes the vehicle brakes to engage. Closing the supply port and connecting the delivery port to the exhaust port releases the vehicle brakes.

In response to an antilock control event, a solenoid control assembly provides for rapid pulsing of the brake application. That is, if an antilock event is sensed, an electronic control unit sends suitable signals to solenoid valve assemblies associated with the modulator. The valve assemblies provide an electro-pneumatic interface between the electronic control unit (ECU) and the air brake system. If an impending wheel lock-up is sensed, the antilock controller immediately begins to modify brake application using the modulator.

Air in the control volume cavity is controlled by selectively opening and closing the supply and exhaust solenoid valve assemblies. Coils associated with the respective solenoid valve assemblies are quickly energized or de-energized in a predetermined sequence by the controller. When the solenoid coil is energized, a core or shuttle is moved to either open or close an associated air passage. This either opens or closes the exhaust passage or reapplies air pressure to the brake actuator. By opening or closing the solenoid valves, the anti-lock controller simulates brake "pumping" but at a rate substantially faster than the driver of a vehicle could actually pump the brakes to avoid skidding.

In known prior art systems, the control signal provided by the foot brake valve on the trailer control valve enters the modulator through a control port. The pressure signal then passes through a small dimensioned, solenoid channel located in an axial center of the solenoid and into the control volume cavity. This arrangement can be problematic should the control signal contain any contaminants. If contaminants reside or build up in the solenoid channel, the channel may become blocked and/or the solenoid valve may not operate as desired.

Releasing the pressure from the control volume cavity in known systems occurs through an orifice exhaust solenoid passage, which is relatively small and limits the amount of air that can be rapidly exhausted. As will be appreciated, the ability to rapidly exhaust air from the control valve cavity is directly related to the performance of service and ABS brake applications. In co-pending U.S. patent application Ser. No. 09/410,519, a quick release exhaust valve was added to the modulator for use during an ABS event to improve ABS performance. However, service brake exhausting from the control volume cavity still occurs through the orifice exhaust solenoid passage.

Thus, any improvement that addresses rapid exhaust during service brake application and limits the undesirable effects of contaminants would be desirable, particularly if easily incorporated into an existing modulator valve without substantial modification.

SUMMARY OF THE INVENTION

In accordance with a preferred embodiment of the invention, an improved modulator relay valve assembly for selectively controlling brake application to an associated brake chamber is provided that improves service brake operation and effectively removes contaminants.

A preferred modulator relay valve assembly comprises a housing having a supply port, a delivery port, a control port, and an exhaust port. A piston is received in the housing defining a control volume and is in communication with the control port. The piston is movable to control communication among the supply, delivery, and exhaust ports. A quick release valve with a direct passage to atmosphere is in communication with the control volume. The quick release valve is biased toward an open position allowing communication from the control volume to atmosphere during service brake and ABS brake applications to quickly exhaust pressure from the control volume on the piston.

In accordance with another preferred embodiment of the present invention, a valve assembly for rapidly releasing control pressure during service braking in ABS applications is provided. The valve assembly comprises a housing having a supply port, a delivery port, a control port, and an exhaust port. A piston is received in the housing defining a control volume and is movable to control communication among the supply, delivery, and exhaust ports. A quick release valve extends from the control volume to provide a direct exhaust passage to allow pressure to rapidly escape from the control volume only through the quick release valve during normal service braking and ABS braking. A hold solenoid valve between the control port and the quick release valve is normally biased toward an open position for allowing communication therebetween. An exhaust solenoid valve between the hold solenoid valve and the quick release valve provides a direct passage to atmosphere. The exhaust valve is normally biased toward a closed position for preventing communication therethrough with atmosphere.

According to yet another aspect of the present invention, a method of quickly exhausting a control volume in an antilock braking system is provided. The antilock braking system includes a hold solenoid valve and an exhaust valve operatively associated therewith. Further the antilock braking system has control, supply, delivery, and exhaust ports selectively regulating supply of air to brake chambers associated with the wheels. The method comprises the steps of connecting the supply and delivery ports for braking in response to a signal at the control port, and connecting the delivery and exhaust ports to release the brakes. At least a portion of the air from the control volume is directed between service brake applications through a quick release valve into the atmosphere to enhance service brake operation.

In accordance with another aspect of the present invention, a valve assembly for rapidly releasing control pressure during service braking in ABS applications is provided. The valve assembly comprises a housing having a supply port, a delivery port, a control port, and an exhaust port. A piston is received in the housing defining a control volume and is movable to control communication among the supply, delivery, and exhaust ports. A non flow-through hold solenoid valve between the control port and the control volume is capable of preventing communication therebetween upon actuation. An exhaust means for releasing a pressure from the control volume during service braking and ABS braking is provided.

A principal advantage of the present invention is the ability to improve ABS and service brake performance in air brake systems.

Another advantage of the present invention resides in the ability to achieve improved exhaust of control air from the relay valve control cavity without increasing the size and power constraints associated with the present solenoid valve assembly.

Another advantage of the present invention is the ability to direct a control signal to a control volume cavity without passing through a solenoid valve channel or passage.

Still another advantage of the invention is the ability to easily modify the existing system to incorporate this feature.

Yet another advantage of the present invention is the ability to expel contaminants from the control volume during service and ABS brake applications.

Still other advantages and benefits of the invention will become apparent to those skilled in the art upon reading and understanding of the following detailed description.

BRIEF DESCRIPTION OF THE DRAWINGS

The invention may take physical form in certain parts and arrangements of parts, a preferred embodiment of which will be described in detail in this specification. The preferred embodiment is illustrated in the accompanying drawings and forms a part of the invention.

FIG. 3 is a schematic representation of the solenoid modulating relay valve assembly shown in FIG. 1 showing the position of the bypass valve relative to the solenoid valves and the control volume.

DETAILED DESCRIPTION OF THE INVENTION

Figure 1:
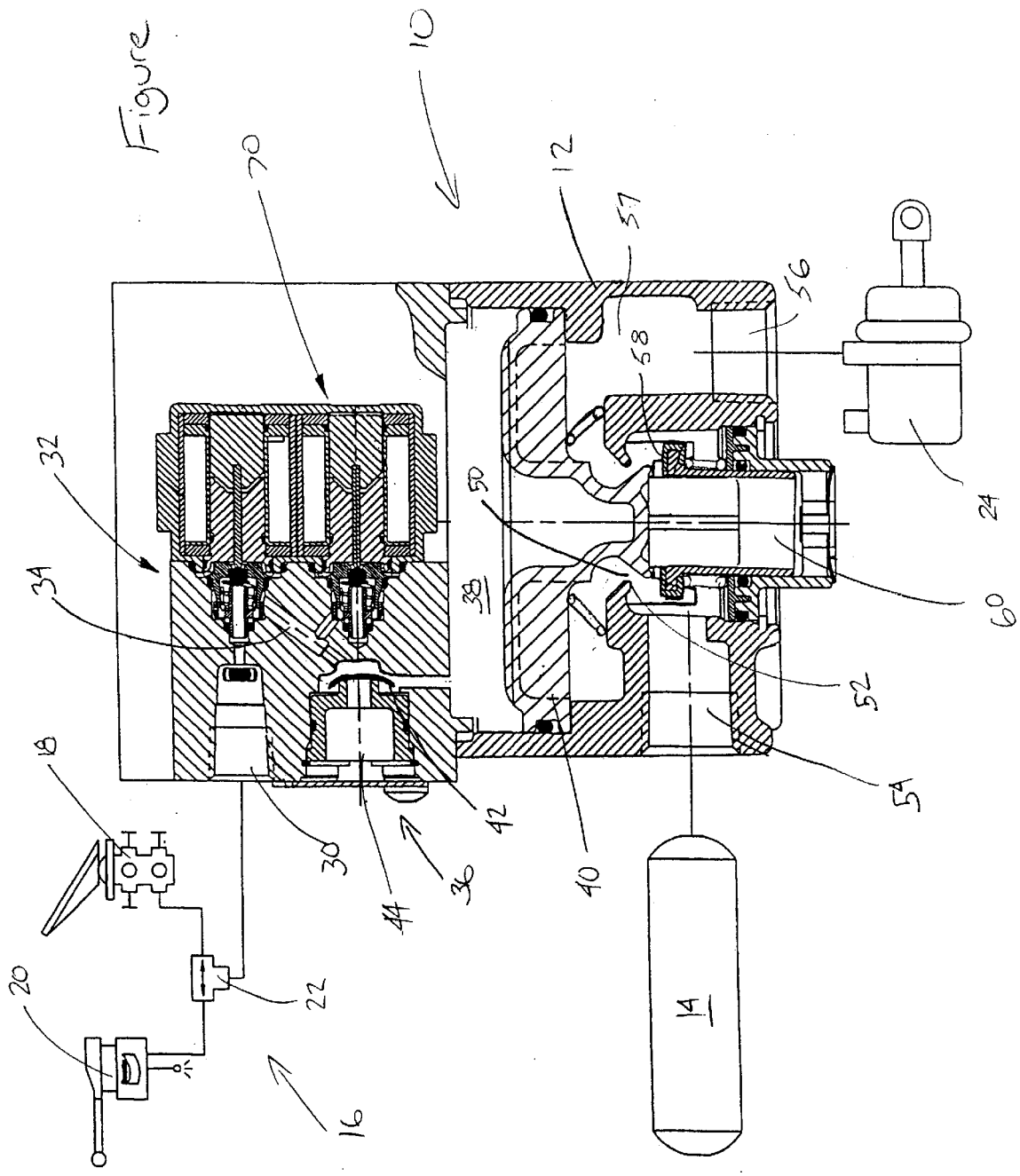
FIG. 1 is a schematic representation of a solenoid modulating relay valve assembly having a quick release valve receiving a pressure signal for use during service brake and antilock brake applications.

FIG. 1 illustrates a pressure modulating relay valve assembly 10 having a housing 12 that communicates with an air supply or pressurized air reservoir 14 and a control valve 16, which may include a foot brake valve 18 and a trailer control valve 20 interconnected, for example, by a double-check valve 22. The relay valve housing 12 also communicates with a brake chamber 24.

A control port 30 of the relay valve selectively receives an air pressure signal from either the brake valve 18 or trailer control valve 20. The air pressure signal passes through an inlet or hold solenoid valve assembly 32 and a cross-drilled passage 34. In the illustrated embodiment, the hold solenoid valve assembly is a non-flow through solenoid valve in which the pressurized air communicates with one end of the solenoid valve assembly only, and selectively allows and precludes communication between the control port 30 and the passage 34.

From the passage 34, the air pressure signal passes through a quick release valve 36 and into a cavity or control volume 38 defined by a first or upper face of a piston 40 received within the housing 12. More specifically, the pressure signal from the passage 34 interacts with a diaphragm 42 of the quick release valve 36 causing the diaphragm 42 to close an exhaust passage 44. The diaphragm remains closed during the duration of the pressure signal. Thus, when a pressure signal occurs and causes the exhaust passage 44 to be closed, communication of the pressure signal from either the brake valve 18 or the control valve 20 is continuous and relatively unimpeded to the control volume 38. The pressure signal creates a pressure on a first face (upper face as shown) of the piston 40 moving and maintaining the piston in the position shown in FIG. 1.

More specifically, the pressurized air acts on the piston 40 and urges it toward a position where an inlet/exhaust valve 50 opens communication between the storage reservoir 14 and the brake chamber 24. That is, the relay piston engages and urges the inlet/exhaust valve 50 from an associated seat 52. This establishes communication between the air reservoir 14 and the brake chamber 24. Thus, a supply port 54 communicates with a delivery port 56 through piston chamber 57. The movement of the piston also engages a valve seat 58 to preclude further communication with an exhaust port 60. Consequently, the brake chamber 24 which is normally in communication with the piston exhaust port 60, is actuated or pressurized by the air.

Figure 2:
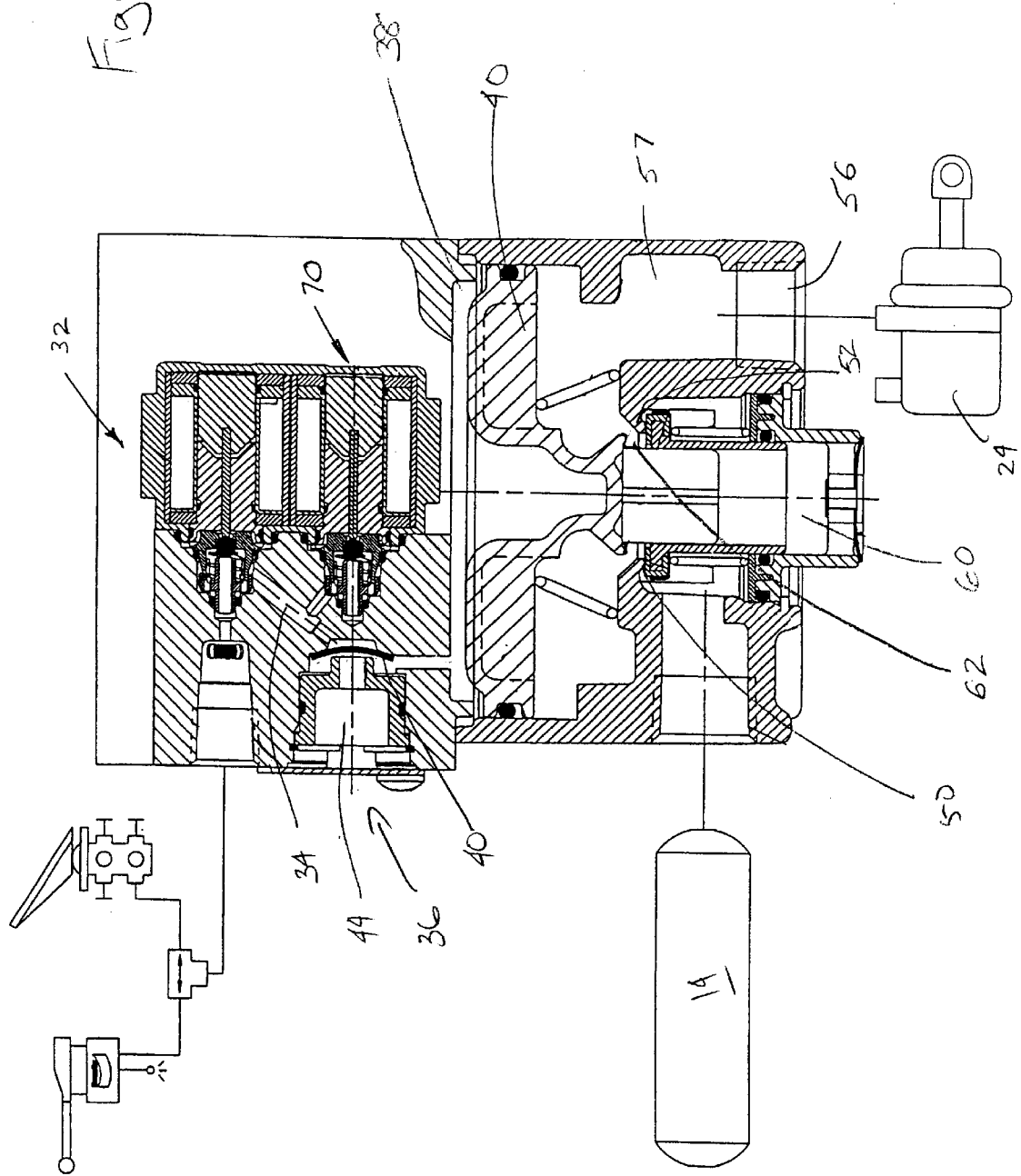
FIG. 2 is a schematic representation of the modulating relay valve assembly of FIG. 1 wherein the quick release valve is not receiving a pressure signal.

With reference to FIG. 2, the control pressure in the control volume 38 above the relay piston 40 is exhausted when the pressure signal ceases and the diaphragm of the quick release valve 36 snaps backs to prevent communication between the passage 34 and the control volume 38. This opens communication between the control volume 38 and the exhaust passage 44 of the quick release valve 36 allowing air pressure to escape from the control volume 38. The control piston also unseats from a piston exhaust valve 62 thus establishing communication between the brake chamber 24 and exhaust port 60. Notably, the inlet/exhaust valve 50 is seated against valve seat 52 preventing communication with the air reservoir. In this manner, the brakes are released until the next brake application is demanded by the operator.

Thus, air is rapidly exhausted from the control volume 38 during all braking applications, including service braking. A significant advantage is achieved by this arrangement. Not only is air rapidly exhausted from the control volume 38 during all braking applications, but contaminants are easily and efficiently expelled through the quick exhaust valve 36 by the nature of the rapid expulsion of air from the control volume. This function of the quick release valve 36 allows for the elimination of other exhaust passages from the control volume 38. For example, some prior art arrangements included a passage through the piston 40 from the control volume 38 for expelling contaminants.

With reference again to FIG. 1, the antilock mode of the relay valve 10 operates when an antilock controller senses impending wheel lock. Under such conditions, electrical signals are sent to the supply solenoid 32 and an exhaust solenoid 70. By selectively opening and closing the solenoids 32, 70, brake pumping is simulated. More particularly, the supply solenoid is normally open and when closed prevents control line pressure from port 30 from further pressurizing control volume cavity 38. On the other hand, the exhaust solenoid 70 is normally closed. When opened, the exhaust solenoid provides a path for air pressure from the passage 34 to exit to atmosphere. The diaphragm 40 of the quick exhaust valve 36 quickly moves to close communication between the passage 34 and the control volume 38 while opening communication from the control volume to the exhaust passage 44. The exhaust solenoid 70 need only exhaust a relatively small volume of air upstream of the quick release valve i.e., in the passage 34 between the quick release diaphragm 42 and the hold solenoid 32. This effectively achieves the rapid exhaust desired for improving ABS and performance.

More specifically, opening the exhaust solenoid 70 allows air from the passage 34 to escape to ambient. This creates a pressure differential between the passage 34 and both the control volume 38 and the exhaust passage 44. The pressure differential causes the diaphragm 42 to quickly close the communication between the passage 34 and the control volume 38. As discussed above, this opens communication between the control volume and the exhaust passage 44 allowing the pressurized air to rapidly escape from the control volume 38.

With reference to FIG. 3, a bypass valve 80 is shown positioned between the control volume 38 and the control port 30. The bypass valve 80 is normally biased toward a closed position preventing air flow therethrough. The bypass valve includes a restricted orifice passage 82. The cross-sectional diameter of the passage 82 is substantially narrow, for example, in the preferred embodiment the diameter of the orifice passage 82 is approximately 0.071 inches. Of course, other cross-sections and dimensions can be used to achieve the same results and all such configurations are intended to be encompassed by the present invention. A ball member 84 prevents air in the control port 30 from flowing through the bypass valve 80. The restricted cross-section of the bypass valve 80 normally prevents air from the control volume 38 from flowing therethrough. However, if the quick release valve 36 or the hold solenoid valve 32 and the exhaust solenoid valve 70 should fail, air from the control volume could then use the bypass valve 80 as a means of exhausting the control volume. The invention has been described with reference to the preferred embodiment.

Obviously, modifications and alterations will occur to others upon reading and understanding this specification. For example, alternative designs of a quick release valve assembly can be used to rapidly and efficiently exhaust air from a control volume. The present invention is intended to include all such modifications and alterations insofar as they come within the scope of the appended claims or the equivalents thereof.

Having thus described the present invention, it is now claimed:

1. A modulator relay valve assembly for selectively controlling brake application to an associated brake chamber comprising:

a housing having a supply port, a delivery port, a control port, and an exhaust port;

a piston received in the housing defining a control volume in communication with the control port and movable to control communication among the supply, delivery, and exhaust ports; and a valve assembly which includes a quick release valve with a direct passage to atmosphere in communication with the control volume, the quick release valve allowing communication from the control volume to atmosphere during service brake and ABS brake release applications to decrease a pressure exerted by the control volume on the piston.

2. The modulator relay valve of claim 1 wherein the quick, release valve is movable to a closed position in response to a pressure signal from the control port increasing the pressure exerted by the control volume on the piston.

3. The modulator relay valve assembly of claim 2 further comprising an exhaust solenoid valve having a direct passage to atmosphere for relieving the pressure signal and allowing the quick release valve to open, the exhaust solenoid valve normally biased toward a closed position for preventing communication with atmosphere.

4. The modulator relay valve of claim 1 wherein the quick release valve provides an exhaust path from the control volume.

5. The modulator relay valve assembly of claim 1 further comprising:

a non-flow through hold solenoid valve between the control port and the control volume normally biased toward an open position for allowing communication therebetween.

6. The modulator relay valve assembly of claim 1 further comprising:

a hold solenoid valve between the control port and the control volume normally biased toward an open position for allowing communication therebetween;

an exhaust solenoid valve having a direct passage to atmosphere positioned between the hold solenoid valve and the control volume, the exhaust valve normally biased toward a closed position for preventing communication with atmosphere; and solenoid coils associated with the hold solenoid valve and the exhaust solenoid valve for selectively actuating the hold and exhaust solenoid valves in response to an electrical control signal indicative of an ABS event.

7. The modulator relay valve assembly of claim 6 where the hold and exhaust solenoid valves work in conjunction with the quick release valve during the ABS event.

8. The modulator relay valve assembly of claim 2 further comprising:

a hold solenoidd valve between the control port and the control volume normally biased toward an open position for allowing communication therebetween.

9. The modulator relay valve assembly of claim 8 wherein the quick release valve includes a flexible member selectively engaging a valve seat, the valve seat disposed at one end of the exhaust solenoid.

10. The modulator relay valve assembly of claim 1 wherein the quick release valve includes a flexible member selectively engaging a valve seat.

11. The modulator relay valve assembly of claim 1 wherein the direct passage to atmosphere from the control volume allows contaminants to be purged from the modulator control volume.

12. A valve assembly for rapidly releasing control pressure during service brake and ABS applications, comprising:

a housing having a supply port, a delivery port, a control port, and an exhaust port;

a piston received in the housing defining a control volume and movable to control communication among the supply, delivery, and exhaust ports;

a quick release valve extending from the control volume to provide a direct exhaust passage allowing pressure to escape from the control volume through the quick release valve during normal service braking and ABS braking;

a hold solenoid valve between the control port and the quick release valve for allowing communication therebetween; and an exhaust solenoid valve between the hold valve and the quick release valve to provide a direct passage to atmosphere, the exhaust valve for preventing communication therethrough with atmosphere.

13. The valve assembly of claim 12 further comprising:

a bypass check valve providing an alternative pressure escape from the control volume during malfunctions of the valve assembly.

14. The valve assembly of claim 13 wherein failure of the quick release valve is a malfunction of the valve assembly.

15. The valve assembly of claim 12 wherein the hold and exhaust solenoid valves are non-flow through valves.

16. The valve assembly of claim 12 wherein the quick release valve functions to expel contamination from the control volume.

17. A method of quickly exhausting a control volume defined on one side of a piston in an antilock braking system having a hold valve and an exhaust valve operatively associated therewith, and control, supply, delivery, and exhaust ports selectively regulating supply of air to brake chambers associated with the wheels, the method comprising the steps of:

connecting the supply and delivery ports for braking in response to a signal at the control port;

connecting the delivery and exhaust ports to release braking in response to an absence of a signal at the control port;

controlling air pressure in the control volume during service brake applications by selectively producing the signal at the control port; and directing at least a portion of the air from the control volume between service brake applications through a quick release valve into the atmosphere.

18. The method of claim 17 further comprising the steps of:

controlling air pressure in the control volume during an ABS application via the hold and exhaust valves in response to an antilock control event; and exhausting at least a portion of air from the control volume during the ABS application through the quick release valve into the atmosphere.

19. The method of claim 17 further comprising the step of:

expelling contaminants from the control volume into the atmosphere between service brake applications.

20. The method of claim 17 further comprising the step of:

exhausting the portion of air from the control volume between service brake applications through the quick release valve.

21. The method of claim 17 further comprising the step of:

exhausting a portion of the air from the control volume through a bypass valve between service brake applications upon malfunction in the quick release valve.

22. The method of claim 17 further comprising the step of:

exhausting a portion of the air from the control volume through a bypass valve between service brake applications upon malfunction of the hold solenoid valve and the exhaust solenoid valve.

23. A valve assembly for rapidly releasing control pressure during service brake and ABS applications, comprising:

a housing having a supply port, a delivery port, a control port, and an exhaust port;

a piston received in the housing defining a control volume and movable to control communication among the supply, delivery, and exhaust ports;

solenoid valve between the control port and the control volume capable of preventing communication therebetween upon actuation; and an exhaust means for releasing a pressure from the control volume during service braking and ABS braking and wherein the exhaust means is a quick release valve disposed between the solenoid valve and the control volume.

24. The valve assembly of claim 23 further comprising:

an exhaust means for purging contaminants from the control volume.

25. The valve assembly of claim 23 wherein the quick release valve permits communication from the control port to the control volume when the hold solenoid valve is in a normal, unactuated state when in a first position, and prevents said communication and allows for said release of pressure when in a second position.

26. The valve assembly of claim 23 further comprising:

an exhaust solenoid valve for releasing a second pressure from an area between the hold solenoid valve and control volume.

\* \* \* \* \*